United States Patent [19]

Schilling et al.

[11] Patent Number: 4,462,840
[45] Date of Patent: Jul. 31, 1984

[54] MIXING OF ASPHALT EMULSION AND AGGREGATE IN AQUEOUS BITUMINOUS EMULSION-AGGREGATE SLURRIES

[75] Inventors: Peter Schilling; Hans G. Schreuders, both of Charleston, S.C.

[73] Assignee: Westvaco Corporation, New York, N.Y.

[21] Appl. No.: 505,783

[22] Filed: Jun. 20, 1983

[51] Int. Cl.$^3$ ............................................. C08L 95/00
[52] U.S. Cl. .............................. 106/277; 106/281 N; 208/44; 252/311.5
[58] Field of Search .......................... 106/277, 281 N; 252/311.5; 208/44

[56] References Cited

U.S. PATENT DOCUMENTS

| | | | |
|---|---|---|---|
| 3,026,266 | 3/1962 | Mertens et al. | 252/311.5 |
| 3,096,292 | 7/1963 | Mertens | 252/311.5 |
| 3,097,174 | 7/1963 | Mertens | 252/311.5 |
| 3,324,041 | 6/1967 | Sommer et al. | 252/311.5 |
| 3,423,221 | 1/1969 | Borgfeldt | 106/277 |
| 3,753,968 | 8/1973 | Ward | 260/97.6 |
| 3,764,359 | 10/1973 | Dybalski | 106/280 |
| 3,859,227 | 1/1975 | Dwyer | 252/311.5 |
| 3,899,476 | 8/1975 | Ward | 260/97.5 |
| 4,013,601 | 3/1977 | Alford | 260/48 PN |
| 4,081,462 | 3/1978 | Powers et al. | 252/108 |
| 4,338,136 | 7/1982 | Goullet et al. | 106/273 N |

*Primary Examiner*—John Kight
*Assistant Examiner*—Amelia B. Yarbrough
*Attorney, Agent, or Firm*—Terry B. McDaniel; Richard L. Schmalz

[57] ABSTRACT

An improved mixing process for aqueous bituminous emulsion-aggregate slurries is disclosed whereby cationic emulsions are prepared by emulsifying bitumen, such as an asphalt, in water with a new kind of cation-active emulsifier which is the product of the reaction of a polyamine with certain polycarboxylic acids wherein one or more additives selected from the group consisting of a polyamine, ammonia, magnesium sulfate, cupric sulfate, chromium chloride, ferric sulfate or dilute sulfuric acid is added to the mixing water to extend the mixing time and to give mixes with good flowability and flotation characteristics.

12 Claims, No Drawings

MIXING OF ASPHALT EMULSION AND AGGREGATE IN AQUEOUS BITUMINOUS EMULSION-AGGREGATE SLURRIES

BACKGROUND OF THE INVENTION

(1) Field of the Invention

The present invention process relates to an improvement in the mixing of mixing-grade, quick setting and slow-setting cationic aqueous bituminous emulsion-aggregate paving slurry seal mixtures. Particularly, the improved mixing process of this invention relates to cationic emulsions prepared by emulsifying bitumen, such as an asphalt, in water with a new kind of cation-active emulsifier which is the product of the reaction of a polyamine with certain polycarboxylic acids wherein one or more additives selected from the group consisting of a polyamine, ammonia, magnesium sulfate, cupric sulfate, chromium chloride, ferric sulfate or dilute sulfuric acid is added to the mixing water to extend the mixing time and to give mixes with good flowability and flotation characteristics.

(2) Description of the Prior Art

Conventionally, emulsion slurry seals are formulated from (1) mineral aggregate which is a fine stone aggregate and/or mineral filler and (2) about 15% to about 25% by weight thereof of a mixing-grade, slow-setting emulsion containing from about 50% to about 75% by weight of bituminous residue (usually asphalt), with a further addition of about 5% to about 25% of water, based on the weight of the dry aggregate, to attain slurry consistency. Usually, densely-graded aggregates, such as granite screenings, limestone screenings, dolomite screenings and blast furnace slag, are combined with bituminous emulsions to produce slurry seal compositions. These aggregates range in size from anything passing all through a sieve of No. 4, and even No. 10 mesh, with from 15% to 20% passing through as fine a mesh as 200 mesh, as described in ASTM C136.

The advent of slurry seal as a paving and road maintenance technique was first developed for use with anionic aqueous bituminous emulsions. A slurry seal is an intimate mixture of emulsified bituminous material and fine-grained aggregate held in suitable suspension until applied to the road surface. The slurry seal emulsion must be of an oil-in-water type. In such admixture with aggregate, the aqueous emulsion form of the bituminous material has been generally preferred because it is less hazardous and more economical to use than hot mix or cutback (solvent containing) asphalts. Further, the aqueous emulsion form can be stored, transported and applied at much lower temperatures, obviating the necessity of heating equipment to maintain a bitumen-aggregate system in a workable or usable form. While these advances have been recognized, widespread acceptance has not been achieved due to disadvantages found in previous bituminous emulsions.

Cationic bituminous emulsions have come into use and eliminate many of the disadvantages of the anionic emulsions. Bituminous emulsions formulated using cationic emulsifiers do not "break" in the same manner as anionic emulsions, but rather the bituminous material is deposited from the emulsion due to the attraction of polar charges between the bituminous droplets and negatively charged aggregate surfaces. Thus, cationic bituminous emulsions deposit more rapidly than the anionic bituminous emulsions on aggregate surfaces and are bonded to the aggregate by the electrostatic action at the interface of the bitumen and the aggregate material.

The aqueous cationic bituminous emulsions themselves are relatively stable, and the emulsion stability may be enhanced by various additives well known in the art. Most cationic bituminous emulsions, however, deposit on the surface of aggregate materials rapidly when aggregate is contacted with the emulsions. Bitumen from an aqueous cationic bituminous emulsion is deposited from the emulsion due to the charge attraction between the bituminous droplets and the aggregate materials. The rapid setting action of cationic bituminous emulsions is of considerable advantage in road building, such as surface seals, since the roads can be opened to traffic shortly after application of the coating. Although the rate of asphalt deposition, for example, from the emulsion can be controlled to some extent, the time required for complete deposition is never very long and it is therefore to combine the cationic emulsion with the aggregate at the site of road construction, either on the surface of the road itself, or in a mobile mixer which permits the emulsion aggregate mix to be rapidly spread. Due to the charge attraction mechanism, the rapidity of deposition of bituminous materials from the cationic emulsion is closely related to the generally negatively charged surface area of the aggregate or filler material. Thus, while a specific cationic bituminous emulsion might provide suitable poperties for use in conjunction with some aggregates, the same cationic emulsion may not exhibit suitable properties when used with very finely ground materials having vastly larger total surface area. The rapid deposition characteristics of the cationic bituminous emulsions frequently makes it impossible to use such emulsions with fine-grained aggregate in slurry form. Therefore, since the slurry seal should mix well, lay down well, not stiffen while being applied, and, after setting, wear well under traffic, it is particularly desirable to be able to control the setting time of the slurry for various aggregates employed.

In U.S. patent application Ser. No. 397,911, an aqueous bituminous emulsion fine-grained aggregate slurry mixture is disclosed which deposits at a fairly rapid rate after being applied to the surface to be treated, and is usable for a longer period of time to enable application in slurry form. The disclosed cationic quick setting and solventless medium setting asphalt emulsion is formed with an emulsifier which is the product of the reaction of a polyamine with a polycarboxylic acid of the general formula

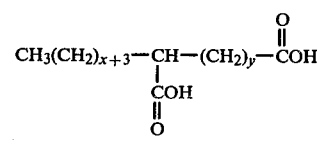

or

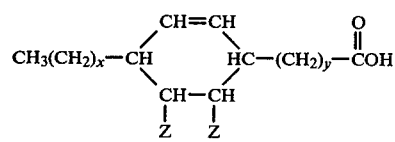

wherein x and y are integers from 3 to 9, x and y together equal 12, at least one Z is a carboxylic acid group and any remaining Z is hydrogen. The rate of setting is determined by emulsifier dosage, pH, aggregate gradation and temperature.

However, it has been found that, with these types of emulsifiers, dependent upon the particular asphalts and aggregates, the mixing times are relatively short and could present a problem in the field.

Accordingly, an object of this invention is to provide an improved process for preparing a mixture of aggregate and bituminous emulsion.

A further object is to provide a process for making a mixture of the above character which is workable under a broad range of conditions.

Another object is to provide an improved mixture of cationic bituminous emulsion and aggregate whose setting time can be varied.

A particular object is to provide an aqueous bituminous emulsion fine-grained aggregate slurry mixture being applied to the surface to be treated.

SUMMARY OF THE INVENTION

The object objectives are met in the cationic aqueous bituminous emulsion-aggregate slurries formed with cationic emulsions prepared by emulsifying bitumen, such as an asphalt, in water with a new kind of cation-active emulsifier which is the product of the reaction of a polyamine with a polycarboxylic acid of the general formula

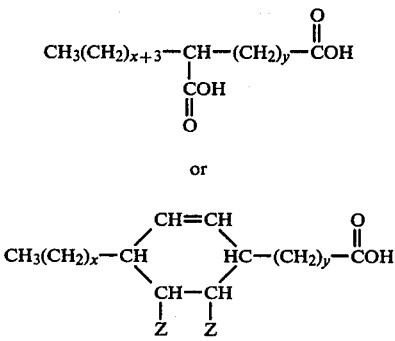

wherein x and y are integers from 3 to 9, x and y together equal 12, at least one Z is a carboxylic acid group and any remaining Z is hydrogen, wherein from 0.2% to 0.7% (by weight based on the total emulsion) of an additive selected from the group consisting of a polyamine, ammonia, dilute sulfuric acid, ferric sulfate, magnesium sulfate, chromium chloride and cupric sulfate is added to the water prior to mixing to extend the mixing time.

DESCRIPTION OF THE PREFERRED EMBODIMENTS

A typical cationic aqueous bituminous emulsion aggregate slurry is formulated in the laboratory with an amount of aggregate pre-wetted with water and admixed with a suitable cationic bituminous emulsion to a desired consistency. Suitable consistency is obtained by using mixed gradations of aggregates forming a smooth non-separating uniform mixture of cationic aqueous bituminous emulsion-aggregate which can be evenly spread onto an existing surface. The ultimate toughness of the applied slurry is obtained as the bitumen, such as asphalt, deposits on the aggregate particles and binds the newly applied coating to the pre-existing surface as a mixture of asphalt cement and aggregate.

As a paving technique at the roadsite, a mobile self-propelled unit capable of uniformly metering the aggregate, water, inorganic or organic additive and emulsion components may be used. A typical unit is equipped with separate tanks for aggregate, water, additive and emulsion which are continually metered into a mixing chamber at a pre-determined ratio. The continually fed components are retained in the mixing chamber for approximately one minute and then fed into a spreader-box and applied to the surface to be coated. Batch operated pneumatic devices can also be used for suitable placement of the cationic bituminous aggregate slurries of this invention.

The improved process of this invention relates to slurries comprised of aggregate and a bituminous emulsion made up of bitumen, water and, as cationic emulsifier, the reaction product of a polyamine and a polycarboxylic acid of the general formula

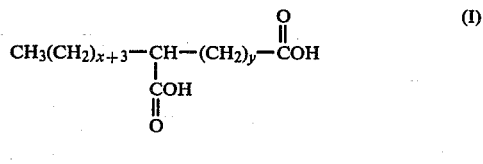

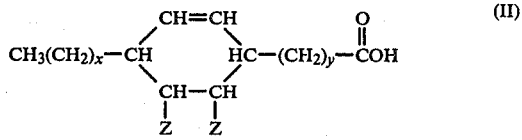

wherein x and y are integers from 3 to 9, x and y together equal 12, at least one Z is a carboxylic acid group and any remaining Z is hydrogen, wherein from 0.2% to 0.7% (by weight based on the total emulsion) of an additive selected from the group consisting of a polyamine, ammonia, dilute sulfuric acid, ferric sulfate, magnesium sulfate, chromium chloride and cupric sulfate is added to the water prior to mixing to extend the mixing time.

The polycarboxylic acids are obtained by reaction of carbon monoxide and water with an unsaturated acid, preferably oleic acid, as described by Reppe and Kroper, in Annalen der Chemie, 582, 63–65 (1953) in the case of formula I, and by Diels-Alder addition of acrylic, metacrylic, fumaric or maleic acid to polyunsaturated fatty acids with conjugated double bonds in the case of formula II, forming a cyclohexane structure. These acids are referred to as $C_{19}$-dicarboxylic acid, $C_{21}$-dicarboxylic acid and $C_{22}$-tricarboxylic acid. Acids of this type are disclosed in U.S. Pat. Nos. 3,753,968 and 3,899,476 to Ward and U.S. Pat. No. 4,081,462 to Powers et al.

The reaction products of the $C_{19}$, $C_{21}$, or $C_{22}$ polycarboxylic acids disclosed herein with more than one polyamine also perform as emulsifiers for cationic aqueous bituminous emulsions. Particularly useful is the reaction product of the $C_{19}$, $C_{21}$ or $C_{22}$ polycarboxylic acid with one or more of the group selected from aminoethyl piperazine, triethylene tetramine, diethylene triamine, aminoethyl ethanolamine, hydroxyethyl piperazine, tetraethylene pentamine and higher homologues.

It has been discovered that addition, in the manner taught herein, of the specified additives alters the reactivity of the emulsions with negatively charged aggregate surfaces and results in decreased solubility of protonated polycarboxylic acid-polyamine condensates in the presence of polyvalent metal ions and sulfate ions. In case of sulfuric acid it appears that the decrease in solubility of the emulsifier in the aqueous phase reduces the rate of interaction of cationic (positively charged) emulsifier (on the surface of the asphalt droplet) with the negative charges of the aggregate surface during or after mixing.

In experiments to replace hydrochloric acid entirely with sulfuric acid in the preparation of the soaps, it was found that the polyamine-polycarboxylic acid condensate ion came out of solution as soon as 0.75% sulfuric acid (based on total emulsion) was added, and no emulsion could be produced.

In the case of polyvalent metal ions, these are adsorbed to the negatively charged aggregate surfaces, resulting in a charge reversal of the aggregate from negative to positive and a reduced rate of break of the cationic emulsion.

In the invention process for preparing the bituminous emulsions, an aqueous acidic solution of the emulsifiers is intimately mixed under high shear in a colloid mill. The bitumen content can range from 30% to about 80% by weight, preferably between 60% and 70%. The dosage of the emulsifier can range from 0.1–10% by weight of the emulsion, preferably between 0.5–2% by weight of the emulsion. Dependent on the emulsifier, a slurry grade emulsion is obtained in a pH range of 2–7, with the optimum performance at a pH of about 2.5.

The "bitumen" used in the emulsion may be derived from domestic or foreign crude oil; it also includes bitumen, natural asphalt, petroleum oil, oil residue of paving grade, plastic residue from coal tar distillation, petroleum pitch, and asphalt cements diluted from solvents (cutback asphalts). Practically any viscosity or penetration graded asphalt cement for use in pavement construction as described in ASTM designation D-3381 and D-946 may be emulsified with the aid of the emulsifiers of this invention.

The cationic soap solutions are normally obtained by suspending the emulsifier in water to which a sufficient amount of a suitable acid, such as hydrochloric acid, is added until the desired pH value below 7 is reached and a clear emulsifier solution is obtained. Thereafter, the soap solution which is preheated to about 55° C. and the fluid asphalt which is preheated to 120°–125° C. are mixed under high shear in a colloid mill to give asphalt emulsions of brown color and creamy texture. Prior to testing according to ASTM D-244, the emulsions are stored at 70° C. for 16 hours.

The aggregates of the invention paving slurry seal mixtures are densely graded aggregates which range in size from anything passing through a No. 4 sieve and at least 80% retained on 200 mesh.

Aggregate mixing tests are performed by mixing the aggregate with water and aqueous bituminous emulsion. An inorganic additive-mineral filler, such as portland cement, hydrated lime, limestone dust and fly ash, may be added to accelerate set/break time and organic salts, such as inorganic sulfates and chlorides, or emulsifiers may be added to retard the set/break of the slurry system. Such additives shall comply with the requirements of ASTM D242. These materials are mixed in a mixing bowl until a homogeneous slurry mixture is obtained.

The inability to form a stable slurry within 30 seconds to 2 minutes of mixing time when proper proportions of each ingredient are used would indicate a mixture in which the materials are not compatible. This mix design is necessary to simulate field conditions. After the slurry is mixed, it is spread in a mold which is placed on an asphalt felt, and the set/break time is measured by blotting the exposed slurry surface with a paper towel. If no brown stain is transferred to the paper towel, the slurry is considered to be "set." The cure time could also be measured with a cohesion testing device. Many other tests such as described in ASTM D3910 are used to measure strength and other physical properties of the slurry. The *Performance Guide for Slurry Seal* published by the Asphalt Emulsion Manufacturers Association is used to measure the performance of the slurry seal.

The emulsion should be stable during mixing and should set within the designed time period following application. The emulsifiers of this invention perform very satisfactorily without auxiliary emulsifiers. For instance, the setting times can be controlled with the concentration of emulsifier, the addition of lime, cement or other inorganic additive or an organic additive, which would alter the break characteristics of the slurry system. An organic additive-polymer latex may also be employed to strengthen the matrix. The organic additive is preferably added to the emulsion-aggregate slurry.

Either a mixture of tall oil fatty acids, preferably tall oil pitch, can be added to the bitumen (asphalt) prior to emulsification to improve break or improve the viscosity of the emulsion, or blends of the above described amidoamines and imidazolines with compatible cationic or nonionic emulsifiers may be used for the emulsification of the bitumen. Auxiliary emulsifiers, which may constitute up to 90% of the total combined emulsifier formulation, are fatty amines, fatty propane diamines, fatty amidoamines, and fatty imidazolines. Others are fatty monoquaternary ammonium salts and fatty diquaternary diammonium salts and nonionic emulsifiers, such as ethylene glycol polyethers of nonyl- or dodecyl phenol. Combinations of amidoamines and imidazolines, based on fatty monocarboxylic acids of various sources and the $C_{19}$- and $C_{21}$-dicarboxylic acids or $C_{22}$-tricarboxylic acid disclosed in this invention, can also be obtained by reacting suitable polyamines with a blend of fatty monocarboxylic and di- or tricarboxylic acids. Monocarboxylic acids suitable for this purpose are tall oil fatty acids, crude tall oil, rosin acids, rosin reacted with fumaric or maleic acid, tall oil pitch, tallow fatty acids, soya fatty acids and the like. Kraft lignin, oxidized lignin, desulfonated sulfite lignin or Vinsol may also be co-reacted.

Dimer acids, which are long chain $C_{36}$-aliphatic carboxylic acids obtained by dimerization of fatty acids of various sources, may be also co-reacted. An example of this type of acid is produced by Emery Industries, Inc. under the trade name "Empol ® Dimer Acids."

The emulsions prepared by the invention process with the di- and tricarboxylic acid-polyamine condensates are stable and can be stored for a long period of time until required for use. The cationic aqueous bituminous emulsions employed in the invention slurries are slow-setting, mixing grade slurries under ASTM D2397; however, the set time may be shortened by adding lime or cement, providing an emulsion with quick-setting characteristics.

The example which follow are illustrative of the improved mixing process used to obtain cationic asphalt-in-water emulsions eminently useful for mixing under shear with a variety of siliceous and calcareous aggregates and providing extended mixing times.

EXAMPLE 1

The demonstrate the advantages of the improved process, cationic bituminous emulsions were prepared both with various claimed additives to extend mixing time and without any additive, as a control. The results are shown in Tables I–III.

TABLE I

| Emulsification Procedure: | |
|---|---|
| Emulsifier: | Reaction product of $C_{22}$—tricarboxylic acid-tall oil fatty acid blend and polyamine blend* |
| Asphalt: | California Hard Emulsion Base (AR-4000) |
| % Emulsifier: | 1.75 |
| Emulsion pH Value: | 3.0 |
| 100 gm Camak aggregate + 16 gm emulsion + 8–11 gm water | |

| Additive** | Mixing Time | Fluidity and Set Time |
|---|---|---|
| 1. 0 additive | broke during mixing | |
| 2. 0.05% ferric sulfate | 1 min. | good flow, set 60+ min. |
| 3. 0.05% ferric chloride | 1 min. | good flow, set 60+ min. |
| 4. 0.05% chromium chloride | 1 min. | good flow, set 60+ min. |
| 5. 0.05% cupric sulfate | 1 min. | good flow, set 60+ min. |
| 6. 0.05% magnesium sulfate | 1 min. | good flow, set 60+ min. |
| 7. 0.02% sulfuric acid | 1 min. | good flow, set 60+ min. |
| 8. 0.2% ammonia | 1 min. | good flow, set 60+ min. |
| 9. 0.1% polyamine blend* | 1 min. | good flow, set 30 min. |

*primarily aminoethyl piperazine and triethylene tetramine
**% based on aggregate

TABLE II

| Emulsification Procedure: | |
|---|---|
| Emulsifier: | $C_{21}$—dicarboxylic acid-polyamine* condensate |
| Asphalt: | Venezuelan Hard Emulsion Base (AC-20) |
| % Emulsifier: | 1.0 |
| Emulsion pH Value: | 4.0 |
| 100 gm Camak aggregate + 16 gm emulsion + 14 gm water | |

| Additive** | Mixing Time | Fluidity and Set Time |
|---|---|---|
| 1. 0 additive | broke during mixing | |
| 2. 0.05% aluminum sulfate | 1 min. | good flow, set 60+ min. |
| 3. 0.0125% ferric sulfate | 1 min. | good flow, set 40 min. |
| 4. 0.05% magnesium sulfate | 1 min. | good flow, set 60+ min. |

*primarily aminoethyl piperazine and triethylene tetramine
**% based on aggregate

TABLE III

| Emulsification Procedure: | |
|---|---|
| Emulsifier: | $C_{21}$—dicarboxylic acid-polyamine* condensate/nonylphenol ethoxylate (80:20) |
| Asphalt: | Venezuelan Hard Emulsion Base (AC-20) |
| % Emulsifier: | 1.0 |
| Emulsion pH Value: | 2.5 |
| 100 gm Camak aggregate + 14 gm water + 16 gm emulsion | |

| Additive** | Mixing Time | Fluidity and Set Time |
|---|---|---|
| 1. 0 additive | broke during mixing | |
| 2. 0.15% ammonia | 1 min. | good flow, set 30 min. |
| 3. 0.05% polyamine blend* | 1 min. | good flow, set 60+ min. |

*primarily aminoethyl piperazine and triethylene tetramine
**% based on aggregate

EXAMPLE 2

This example demonstrates the improved mixing and extended mixing time achieved by adding a minor portion of dilute sulfuric acid to the hydrochloric acid used in the preparation of the soaps.

The following emulsification procedure was employed:

Emulsifier: $C_{21}$-dicarboxylic acid-polyamine condensate/nonylphenol ethoxylate (80:20)
Asphalt: Venezuelan Hard Emulsion Base (AC-20)
Acid: HCl
% Emulsifier: 1.5
Emulsion pH Value: 3.0
100 gm Camak aggregate + 14 gm water + 16 gm emulsion The bituminous emulsion-aggregate slurry produced exhibited poor mixing and poor flow, or fluidity.

In the experiment following, the identical emulsification procedures were observed as before with the exception that 0.25% (based on asphalt) sulfuric acid was added to the hydrochloric acid used in preparation of the soaps. The resultant bituminous emulsion-aggregate slurry permitted mixing for one minute and provided good flow and a set time of 60 minutes plus.

While this invention has been described and illustrated herein by references to various specific materials, procedures and examples, it is understood that the invention is not restricted to the particular materials, combinations of materials, and procedures selected for that purpose. Numerous variations of such details can be employed, as will be appreciated by those skilled in the art.

What is claimed is:

1. An improved process for preparing a paving slurry seal mixture of a cationic aqueous bituminous emulsion and mineral aggregate capable of being worked comprising mixing a densely graded mineral aggregate passing through No. 4 and at least 80% retained on 200 mesh screen, and from about 4% to about 16% water, based on the weight of the mineral aggregate, containing up to 3% of an inorganic or organic additive to reduce the setting time of the mixture to prewet the aggregate, and mixing the prewetted aggregate with from about 8% to about 20% of an oil in water type emulsion, based on the weight of the mineral aggregate, wherein the emulsion is comprised of from about 30% to about 80% bitumen, based on the weight of the emulsion, from about 0.1% to about 10% of a cation-active emulsifier based on the weight of the emulsion, wherein the emulsifier is selected from the group consisting of reaction products of one or more polyamines reacted with a polycarboxylic acid corresponding to the formulae

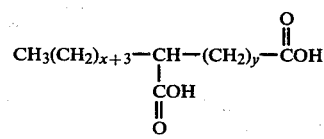

and

-continued

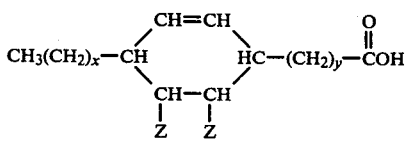

wherein x and y are integers from 3 to 9, x and y together equal 12, at least one Z is a carboxylic acid group and any remaining Z is hydrogen, and water to make up 100% by weight of the emulsion, the emulsion having a pH in the range of from 2-7, wherein the improvement comprises adding from 0.2% to 0.7% of one or more additives selected from the group consisting of polyamines, ammonia, magnesium sulfate, cupric sulfate, chromium chloride, ferric sulfate and dilute sulfuric acid to give cationic bituminous emulsions of extended mixing times.

2. The improved process of claim 1 wherein the emulsion is a slow-setting, mixing grade composition.

3. The improved process of claim 1 or 2 including up to 90% of the total emulsifier of one or more auxiliary emulsifiers selected from the group consisting of fatty amines, fatty propane diamines, fatty amidoamines, fatty imidazolines, fatty monoquaternary ammonium salts, fatty diquaternary diammonium salts, and ethylene glycol polyethers of nonyl or dodecyl phenol.

4. The improved process of claim 1 or 2 including up to 90% of the total emulsifier of one or more auxiliary emulsifiers selected from the group consisting of nitrogen derivatives of resin acids and nitrogen derivatives of kraft lignin.

5. The improved process of claim 1 or 2 wherein the emulsifier is prepared by reacting the polyamines with a blend of fatty monocarboxylic acids and the polycarboxylic acid.

6. The improved process of claim 1 or 2 wherein the emulsifier is prepared by reacting the polyamines with a blend of resin acids and the polycarboxylic acid.

7. The improved process of claim 1 or 2 wherein the emulsifier is prepared by reacting the polyamines with a blend of kraft lignin and the polycarboxylic acid.

8. The improved process of claim 1 or 2 comprising from about 60% to 70% bitumen by weight of the emulsion, from about 0.5% to 2.0% emulsifier by weight of the emulsion, and water to make up 100% by weight, the emulsion having a pH of about 2.5.

9. The improved process of claim 1 wherein a mixture of tall oil fatty acids is added to the bitumen prior to emulsification.

10. The improved process of claim 9 wherein the tall oil fatty acids mixture is tall oil pitch.

11. The improved process of claim 1 or 2 wherein the polyamines are selected from the group consisting of aminoethyl piperazine, triethylene tetramine, diethylene triamine, aminoethyl ethanolamine, hydroxyethyl piperazine and tetraethylene pentamine.

12. The improved process of claim 1 or 2 wherein the inorganic additive is selected from the group consisting of portland cement, hydrated lime, limestone dust, and fly ash.

* * * * *